Aug. 22, 1961 C. WILLIAMS 2,996,867
RIDING TRACTOR MOWER
Filed April 13, 1959 3 Sheets-Sheet 1

INVENTOR.
CHESTER WILLIAMS
BY Edward M. Apple
ATTORNEY

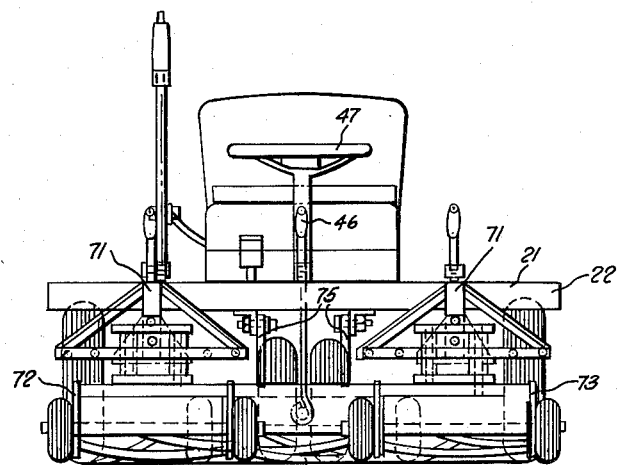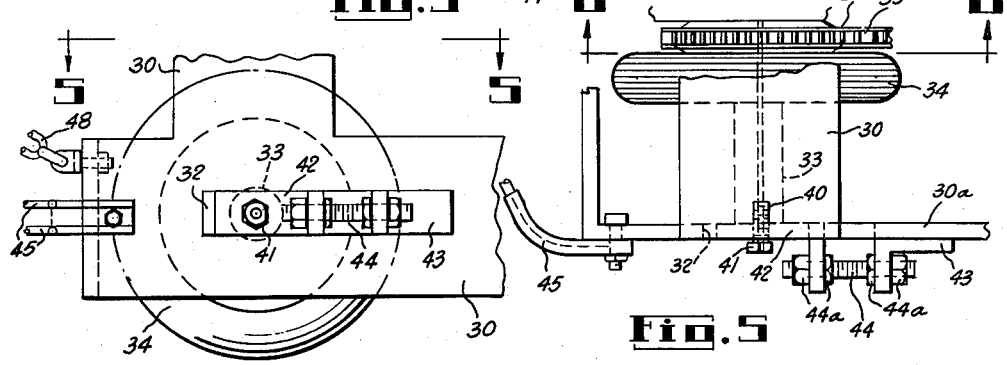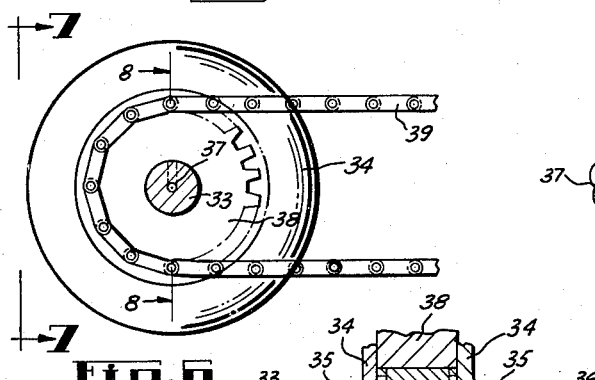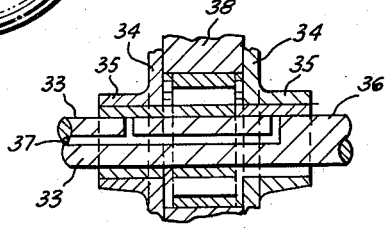

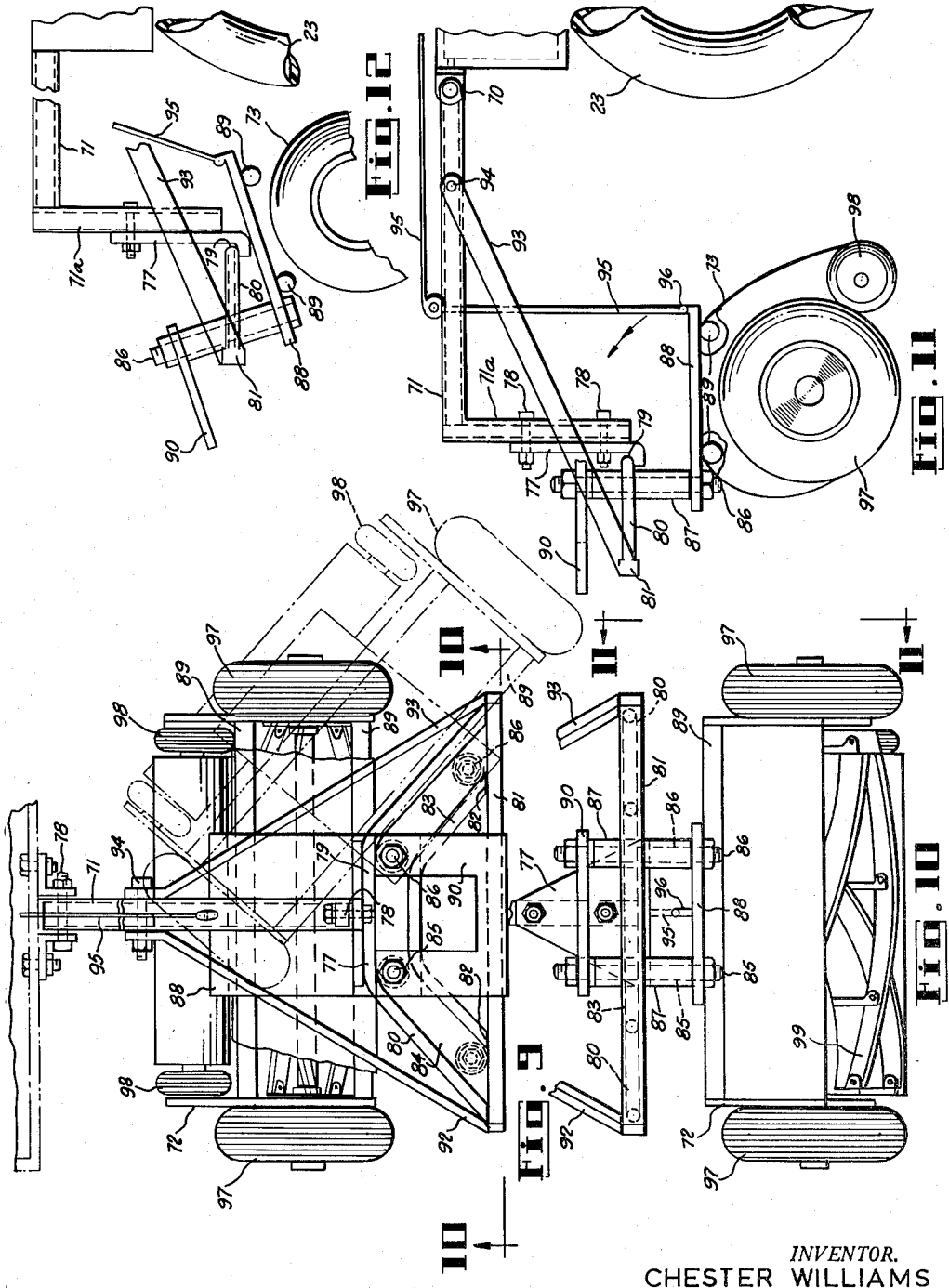

United States Patent Office 2,996,867
Patented Aug. 22, 1961

1

2,996,867
RIDING TRACTOR MOWER
Chester Williams, 5651 Carpenter Road, Ypsilanti, Mich.
Filed Apr. 13, 1959, Ser. No. 806,136
12 Claims. (Cl. 56—7)

This invention relates to power mowers, and has particular reference to a riding tractor, suitable for commercial, institutional, or park use, or on estates and the like, where large expanses of lawn are to be taken care of.

An object of the invention is to generally improve devices of the character indicated and to provide a reel type power mower, with novel means to suspend the reels in front of the tractor, so that there is always a two point working contact between the tractor and each reel, whereby the reels may be effectively pushed in any angular direction, and whereby the reels are efficiently controlled for cutting around trees and in closely confined spaces.

Another object of the invention is to provide a front suspension for a plurality of reel type mowers, which provides vertical and horizontal movement action between the tractor and each of the mowers, whereby each mower can independently negotiate rough and uneven terrain.

Another object of the invention is to provide a multiple reel type, riding power mower, with novel means for mounting the reels in working position in front of the operator, whereby all of the reels may uniformly operate in any desired forward or lateral direction, yet each reel is free to oscillate in a vertical direction, whereby to negotiate uneven terrain, which is not uniform with respect to the several reels.

Another object of the invention is to provide a novel front suspension for multiple reels in a riding type lawn mower, whereby each reel may be individually locked out of contact with the ground for transportation, or storage and the like.

Another object of the invention is to provide a multiple, reel type, riding, power mower in which each reel is individually mounted at the end of a pivoted arm, each of which arms may readily be removed from the mower frame by the removal of a pin, whereby a snow plow or the like can be substituted in place of the reels.

Another object of the invention is to provide a riding type, power lawn mower mechanism, which is constructed and arranged so that it obviates the use of any conventional transmission and differential.

Another object of the invention is to provide a riding, power lawn mower with novel means for driving the device from the rear, whereby to provide better power in all directions of operation and to effect power steering of the device when in operation.

Another object of the invention is to provide novel means for driving the tractor, whereby the tractor may be moved forward, or in reverse, and may be turned within a very small radius, so that the mower can be used for close cutting operation around trees, shrubs and the like.

Another object of the invention is to provide a power source for a riding mower, which is constructed in such a manner that when the drive wheels are set dead ahead the machine will move forward in a straight line, without deviation, and when the drive wheels are set off of dead ahead, in either direction, power steering will be effected, and the machine will move in the same radius as set, until the drive wheels are again set in a different position.

Another object of the invention is to provide a device of the character described, in which the driving motor is pivotably mounted in the rear, whereby the driving motor may be oscillated downwardly to effect forward motion of the device, and may be oscillated upwardly to effect reverse operation of the device.

Another object of the invention is to provide a riding, power lawn mower, which is constructed and arranged with novel means for supporting the drive wheels, whereby the wheels may readily be removed for changing tires and the like, by simply removing two machine screws.

Another object of the invention is to provide a rear drive, riding mower in which the driving motor is spring backed, whereby to permit more or less weight on the drive wheels for traction purposes.

Another object of the invention is to provide a riding tractor with rear drive, power means having novel means for adjusting the power transmission from the power source to the driving wheels.

Another object of the invention is to provide a rear drive, riding power mower with means to keep the power transmission elements free from cut grass and other debris, which may be thrown rearwardly.

The foregoing and other objects and advantages of the invention will become more apparent as the description proceeds, reference being made from time to time to the accompanying drawings, forming part of the within disclosure, in which drawings:

FIG. 3 is a front elevational view of the device shown in FIGS. 1 and 2.

FIG. 4 is an enlarged fragmentary detail, illustrating the means for adjusting the tension on the drive chain.

FIG. 5 is a view, partly in section, taken substantially on the line 5—5 of FIG. 4.

FIG. 6 is a section taken substantially on the line 6—6 of FIG. 5.

FIG. 7 is a view taken substantially on the line 7—7 of FIG. 6.

FIG. 8 is a fragmentary section taken substantially on the line 8—8 of FIG. 6.

FIG. 9 is an enlarged top plan view of one of the mower suspension assemblies illustrated in FIG. 1, with dotted lines to illustrate one of the lateral adjusted positions of the mower.

FIG. 10 is a fragmentary front elevational view taken substantially on the line 10—10 of FIG. 9.

FIG. 11 is a fragmentary elevational view taken substantially on the line 11—11 of FIG. 10.

FIG. 12 is a view similar to FIG. 11, but illustrating the mower in elevated position for transportation.

Figures 13, 14:
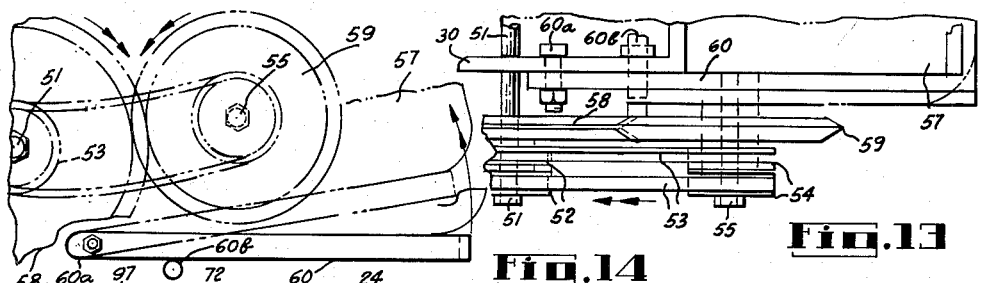
FIG. 13 is an enlarged detail taken substantially on the line 13—13 of FIG. 1, and illustrating the V belts in tightened condition for forward drive.
FIG. 14 is a side elevational view of the structure shown in FIG. 13, but illustrating the V belts in slack condition and the reverse drive in operation.

Referring now more particularly to the drawings, it will be understood that in the embodiment herein disclosed, the reference character 21 indicates a platform, which is preferably made of metal, and is supported by a metal frame 22, which may be made of angle iron, or other suitable material, which is welded, or otherwise secured, to the platform 21 to form an integrated member of substantial rigidity. The platform 21 has means (not shown) for supporting a pair of wheels 23 and 24, which are preferably rubber tired.

The wheels 23 and 24 are free to rotate on the axle 25, which axle is fixed, with respect to the platform 21. The frame 22 has a rearward extension 26, which supports a battery box 27 and a bearing member 28, in which is rotatably mounted a spindle 29, which supports the auxiliary frame 30, which is pivotable about the axis of the spindle 29. The side members 30a of the auxiliary frame 30 are slotted as at 32 (FIG. 4), which slots are adapted to receive the axle adjusting members, as hereinafter described.

Figure 1:
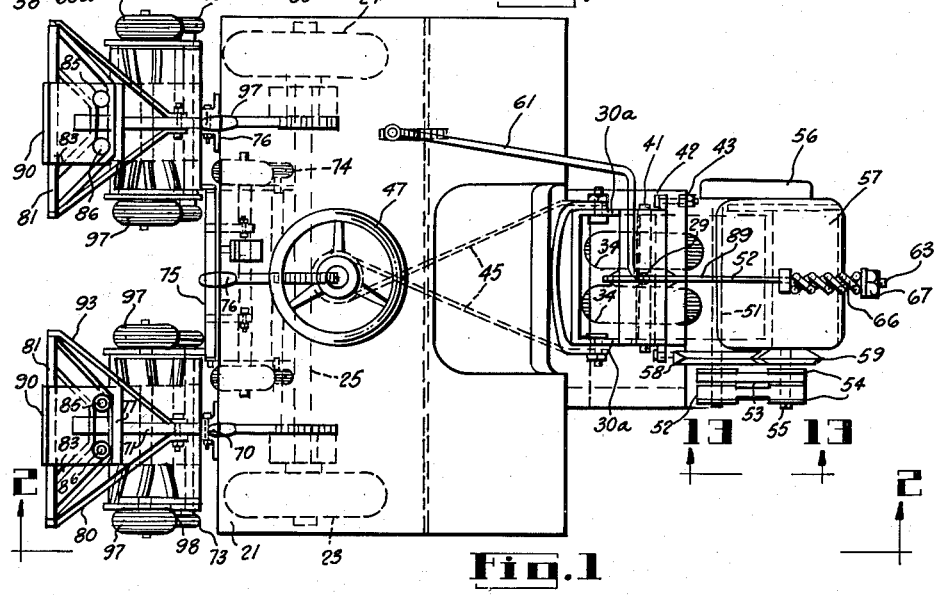
FIG. 1 is a top plan view of a device embodying the invention.
Figure 2:
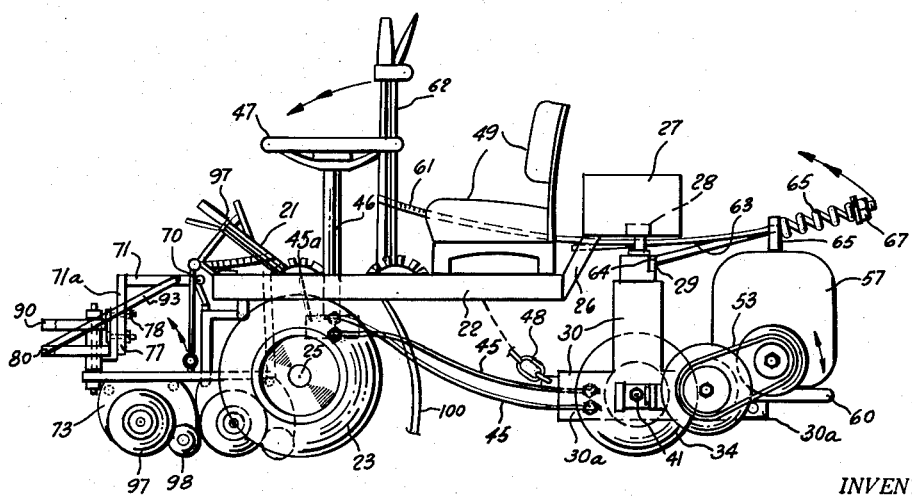
FIG. 2 is a side elevational view, taken substantially on the line 2—2 of FIG. 1.

Each drive wheel 34 has a hub portion 35, which hubs 35 are provided with a bearing member 36, each of which rotates about the shaft 33. The bearings 36 are lubricated through a bore 37, formed in the axle 33, so that the wheels 34 may be lubricated from the exterior of the machine. A sprocket wheel 38 is interposed between, and is secured to, the wheels 34, as at 34a, and is driven by means of a chain 39, as hereinafter described. Each end of the axle 33 is drilled as at 40 (FIG. 5) to receive a machine screw 41. The machine screws 41 extend through openings formed in the L-shaped adjusting members 42, which are slidable in the slots 32. Other L shaped members 43 are welded, or otherwise secured, to the side frame members 30a (FIG. 5), and the short legs of the L-shaped members 42 and 43 are bored to receive the adjusting screw bolt 44, and nuts 44a, so that each L-shaped member 42 may be laterally adjusted, with respect to its L-shaped member 43. This permits the shaft 33 to be adjusted forwardly or rearwardly, which in turn adjusts the tension on the drive chain 39. The wheels 34 are the drive wheels, as well as the steering wheels, for the device. The auxiliary frame 30—30a and the wheels 34 are steered by means of cables 45 (FIGS. 1 and 2), which engage a drum 45a, which is secured at the lower end of the steering rod 46, which is rotated by means of the steering wheel 47, as in conventional practice. A chain 48 limits the pivoting action of the frame 30—30a and the drive wheels 34 on the spindle 29. The operator controls the steering wheel 47 and the other elements, hereinafter described, from a seat 49, which is mounted on top of the platform 21.

The drive chain 39 for the drive wheels 34, engages a second sprocket 50 (FIG. 1), which is mounted on an idler shaft 51, which is supported, at either end for rotation, in the side members 30a of the auxiliary frame 30. The idler shaft 51 extends outboard of the frame members 30a and at one end has mounted thereon, a pair of V pulleys 52, which V pulleys are driven by V belts 53, which V belts 53 also engage another pair of V pulleys 54, mounted at the end of a shaft 55, which is driven through a gear reduction assembly 56 (FIG. 1), which in turn is driven by a gasoline engine 57. When the V belts 53 are tight, as shown in FIG. 13, the vehicle will be driven in a forward direction, when the V belts are slack, as shown in FIG. 14, the reverse drive mechanism is then brought into action. The reverse drive mechanism consists of a V pulley 58, which is mounted on the shaft 51, and rotates in the same direction as does the pulleys 52. A smaller, drive wheel 59 is mounted on the shaft 55, and rotates with the V pulleys 54. The drive wheel 59, however, has a wedge shaped periphery, which is arranged to be received in the V of the pulley 58, so that when the pulley 58 and the drive wheel 59 are in engagement, the device will be driven in a reverse direction, as shown by the arrows in FIG. 14. This is an important feature of the invention, as it permits the device to be driven forwardly, and in reverse, without the necessity of a conventional transmission and differential. The forward and reverse drives are effected, by the manner in which I mount the engine 57. The engine 57 is mounted on a small platform 60, which is pivoted by suitable means, as at 60a, to the frame 30, so that the rear end of the platform 60 and the motor 57 may oscillate up and down, as shown by the arrows in FIG. 2. The downward movement of the engine 57 causes the belts 53 to be tightened for forward drive, FIG. 13. The upward movement of the platform 60, and the engine 57, causes the V belts 53 to be slackened as shown in FIG. 14, and the drive wheel 59 to be moved into engagement with the large V pulley 58, to effect the reverse drive. The engine 57 is raised and lowered by means of a flexible cable 61, which is controlled by a lever 62, positioned near the drivers seat 49. Another novel feature of the invention resides in the resilient support, which I provide for the platform 60 and the engine 57. This support consists of a rod 63 which is pivoted, as at 64, to the frame 30, and the rod 63 extends through a member 65, which is welded, or otherwise secured, to the top of the engine 57. The rod 63 is backed with a spring 66, the tension of which may be adjusted by means of a nut 67, which is threaded onto the end of the rod 63. By adjusting the tension on the spring 66, the weight factor of the platform 60, and the engine 57, may be varied, to put more, or less, weight on the drive wheels 34, for traction purposes. A stop 60b is also provided for limiting the downward movement of the platform 60 (FIGS. 13 and 14).

With the drive control, which I have just described, I provide the tractor with a novel power means, which provides forward and reverse motion and also effects power steering of the tractor, in all settings of the drive wheels on either side of dead ahead position.

I will now describe the novel, mower mounting means, which comprise another important feature of the invention.

Pivoted near the front of the platform 21, as at 70 (FIG. 11) and arranged for vertical oscillation is a push frame which includes the arms 71, which push frame serves as a support for a reel type lawn mower. In the instant disclosure I illustrate the use of two mowers so supported, which are generally indicated by the reference characters 72 and 73. I also disclose a third mower 74, which is mounted slightly to the rear of the mowers 72 and 73, and positioned, so that it will cover the area between the mowers 72 and 73. The third mower 74 is mounted on a pair of arms 75, which are arranged for vertical oscillation, but which do not provide the mower 74 with lateral movement, as is provided for the mowers 72 and 73. The mower 74 may be elevated from the ground by swinging upwardly the arms 75, by means of a lever 76 and a cable (not shown), which connects the lever 76 with a suitable fitting (not shown) on a central portion of the mower 74.

The mowers 72 and 73 are each mounted for vertical movement, and are also mounted so that they may assume various positions of lateral adjustment, as shown in FIG. 9. In other words, each of the mowers 72 and 73 is is suspended for vertical and horizontal action with respect to the platform 21. The push frame or suspension means for each of the mowers 72 and 73 is the same, so that a description of one of the suspensions will suffice for both of them. Each pivoted arm 71 has a downward extension 71a, which serves as a support for a substantially triangular plate 77 (FIGS. 9–12), which plate 77 is secured to the extension 71a, by means of bolts and nuts 78, or other suitable means. Welded to the plate 77, as at 79 (FIGS. 9 and 11), is a rod 80, which is bent and rebent, to form an extended, U-shaped member. To the free ends of the rod 80 is welded a cross-member 81, which is preferably in the form of a heavy metal strap. Welded as at 82 to the cross rod 81 is another rod 83, which is bent and rebent in the same manner as is the rod 80. The rods 80 and 83 are equally spaced throughout their length, lie in a common plane, and serve as guides, and define between them a space 84 in which travel a pair of guide pins 85 and 86. Each of the guide pins 85 and 86 has a bushing 87 on its outside, which serves as a roller for reducing friction, in the movement of the guide pins 85 and 86 between the rods 80 and 83. It will be noted that each of the three straight sections of the rod 80, is of sufficient length, to permit the two pins 85 and 86 to engage it, so that no matter in which lateral direction the mower 72 is moved, it will always have two points of pushing contact between the rod 80 and the pins 85 and 86. This is an important feature of the invention as it permits each mower 72 to be pushed in any radial direction throughout a wide arc. This structure also provides each mower with substantial vertical and horizontal action, so that each mower may separately negotiate uneven terrain. The drive pins 85 and 86 are secured at their lower ends to a plate 88, which is welded, or otherwise secured, to the top of the tie rods 89, which comprise part of the mower assembly. Secured near the upper ends of the guide pins 85 and 86 is a plate 90, which serves as the downward limiting means, whereas the plate 88 serves as the upward limiting means, for the movement of the mower 73, with respect to the elements 80, 81, and 83. Crossbraces 92 and 93 connect the extreme ends of the cross-rod 81 with the arm 71, as at 94, and serve to take up any lateral thrust on the arms 71. A cable 95 is secured, as at 96, to the plate 88 and extends upwardly through an opening in the arm 71, and then backwardly to a control lever 97, so that each mower and its suspension means may be elevated from the ground, as shown in FIG. 12, for transportation or storage. It will be understood that each of the mowers 72 and 73 is provided with rubber-tired wheels 98, and a reel 99, all of which are conventional. The reel 99 of each mower is driven through suitable gears by the large wheels 97, as the mower is pushed by the tractor.

In order to prevent cut grass and other debris from clogging up the rear drive mechanism previously described, I provide a shield 100 (FIG. 2) which depends from the underside of the platform 21.

It is believed that the operation of the device is obvious from the foregoing description.

Having described my invention what I claim and desire to secure by Letters Patent is:

1. A lawn mower comprising a push frame having a substantially horizontal transverse pivot means adjacent one end thereof, a substantially U-shaped guiding track adjacent the opposite end of said frame, a pair of laterally spaced pins engaging said guiding track, and a mower connected to said pins.

2. A lawn mower comprising a push frame having a substantially horizontal transverse pivot means adjacent one end thereof, a substantially U-shaped guiding track adjacent the opposite end of said frame, a pair of laterally spaced pins engaging said guiding track, and a mower connected to said pins, a platform for pivotably supporting said push frame, wheels for supporting said platform, including a pair of closely spaced wheels at the rear of said platform, said last named wheels being mounted in a frame supported at the end of a spindle, which is journaled to said platform and arranged to rotate about a vertical axis, a second and smaller platform pivotably secured to last named frame, an engine mounted on said last named platform, and drive means connected to said engine and being actuated by the pivotal movement of said second platform, for driving said pair of closely spaced wheels in forward and reverse directions.

3. The structure of claim 2, including manual means accessible from said first named platform for pivoting said second platform.

4. The structure of claim 2, including resilient means for controlling the pivotable movement of said second platform.

5. The structure of claim 2, including means for vertically and laterally adjusting said second named platform.

6. The structure of claim 2, in which said drive means include a sprocket secured to said pair of rear wheels, a sprocket secured for rotation with a second shaft supported by said last named frame, a chain connecting said sprockets, a V pulley secured to said second shaft, a V pulley secured to the shaft of said engine, and V belts connecting said pulleys.

7. The structure of claim 2, in which said drive means include a sprocket secured to said pair of rear wheels, a sprocket secured for rotation with a second shaft supported by said last frame, a chain connecting said sprockets, a V pulley secured to said second shaft, a V pulley secured to the shaft of said engine, and V belts connecting said pulleys, there being a second V pulley on said second shaft for receiving a friction wheel carried by the shaft of said engine.

8. The structure of claim 2, in which said drive means include a reduction gear assembly on said engine, a shaft driven by said reduction gear assembly, a V pulley on said last named shaft, a second shaft rotatably supported by said last frame, a V pulley on said second shaft, V belts connecting said pulleys, a sprocket on said second shaft, a sprocket secured to said pair of closely spaced wheels, a chain connecting said sprockets, a second and larger V pulley on said second shaft, and a smaller friction wheel secured to said reduction gear shaft and arranged to be received in said larger V pulley.

9. The structure of claim 2, in which the means for supporting said push frame and mower includes an arm pivoted to the front of said platform, said arm having an extension, carrying a plate to which is welded, or otherwise secured, a modified U-shaped rod, the ends of which are joined by a cross rod, a second modified U-shaped rod secured to said cross rod in spaced relation to said first named rod and defining an opening therebetween, said pair of pins being loosely positioned in said opening, said pins being secured at the bottom to said mower, and said pins being secured at the top to a plate which overhangs at least two of said rods.

10. The structure of claim 2, in which the means for supporting said push frame and mower includes an arm pivoted to the front of said platform, said arm having an extension, carrying a plate to which is welded, or otherwise secured, a modified U-shaped rod, the ends of which are joined by a cross rod, a second modified U shaped rod secured to said cross rod in spaced relation to said first named rod and defining an opening therebetween, said pair of pins being loosely positioned in said opening, said pins being secured at the bottom to said mower, and said pins being secured at the top to a plate which overhangs at least two of said rods, and means secured to said mower and said arm for elevating said mower and said arm.

11. The structure of claim 2, in which the means for supporting said push frame and mower includes an arm pivoted to the front of said platform, said arm having an extension, carrying a plate to which is welded or otherwise secured a modified U shaped rod, the ends of which are joined by a cross rod, a second modified U-shaped rod secured to said cross rod in spaced relation to said first named rod and defining an opening therebetween, said pair of pins being loosely positioned in said opening, said pins being secured at the bottom to said mower, and said pins being secured at the top to a plate which overhangs at least two of said rods, means secured to said mower and said arm for elevating said mower and said arm, and angular braces secured to the ends of said cross rod and the sides of said arm, for absorbing thrust on said mower suspension means.

12. The structure of claim 2, in which there are at least three reel type mowers secured to arms pivoted to said platform, each of said arms having a plate secured to it, a modified U-shaped rod, laterally secured to said plate, a cross rod joining the ends of said U-shaped rod, a second modified U-shaped rod secured to said cross rod in parallel relation to said first rod and defining said guide track, the said pair of spaced pins being loosely received between said rods, said pins being secured at the bottom to a mower, and said pins being secured at the top to a plate which overhangs certain of said rods.

References Cited in the file of this patent

UNITED STATES PATENTS

| | | |
|---|---|---|
| 1,614,333 | Worthington | Jan. 11, 1927 |
| 2,099,902 | Meyer et al. | Nov. 23, 1937 |
| 2,299,859 | Speiser | Oct. 27, 1942 |
| 2,306,042 | Custer | Dec. 22, 1942 |
| 2,475,671 | McCartney | July 12, 1947 |